May 29, 1962   E. G. HANSEN   3,036,779
MULTIPLE BRANCH HEATING SYSTEM AND METHOD
Filed April 28, 1959

INVENTOR.
ERWIN G. HANSEN
BY
Kenyon & Kenyon
ATTORNEYS 3,036,779
**MULTIPLE BRANCH HEATING SYSTEM
AND METHOD**
Erwin G. Hansen, New York, N.Y., assignor to Midland-
 Ross Corporation, New York, N.Y., a corporation of
 Ohio
Filed Apr. 28, 1959, Ser. No. 809,460
7 Claims. (Cl. 237—63)

This invention relates to a multiple branch heating system and more particularly to a closed multiple branch heating system using a liquid, at or near the flash point, as the heat carrier.

In many central heating systems serving commercial and residential buildings or industrial plants, it is often desired to maintain different temperatures in some of the branches. There are other installations called district heating systems in which many individual buildings are served from one central heat source. In this type of system individual buildings or groups of buildings may form one branch and these branches may be further sub-divided into various zones.

The disadvantage inherent in present multiple branch heating systems is that a pressure considerably in excess of the heating liquid vapor pressure must be maintained in the heat using equipment and the distribution means including mains, branches, risers and zones. This is undesirable since it is generally desirable to maintain the pressure as low as possible. If a low pressure can be maintained in the heat using equipment and the components constituting the distributing mains, branches and zones, then those components can be materially reduced in strength thereby reducing the cost of the installation. However, if at any point in the system the pressure is lower than the vapor pressure, then flashing and water hammer will occur.

In view of the foregoing, the primary object of the present invention is to provide a multiple branch heating system utilizing one or more circulating pumps in which it is not necessary to maintain a pressure considerably in excess of the heating liquid vapor pressure in the heat using equipment and the components constituting the branches and zones.

A further object of this invention is to provide a multiple branch heating system, utilizing a multi-stage circulating pump or pumps, with the point of applied system pressure located between the stages of the pump or pumps.

These and further objects and features of the invention will appear from the following detailed description to be read in conjunction with the accompanying drawings wherein like components in the several views are identified by like reference numerals.

Figure 1:
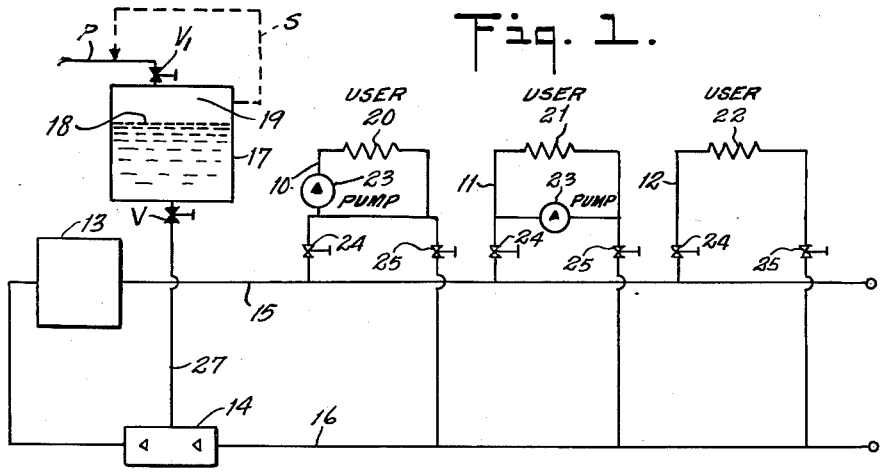
FIGURE 1 is a flow diagram of the multiple branch heating system of the present invention.

Referring now to the drawings, the multiple branch heating system of the present invention will be described with reference to the differences and advantages thereof over present day multiple branch heating systems. These multiple branch heating systems are designed to supply heat to one or more branch systems designated in general by the numerals 10, 11 and 12.

The heat carrier utilized is a liquid such as water which is heated in a heat source 13. The heat source 13 may be a direct fired boiler or boilers, or any other kind of heat exchanger, singly or in multiple arrangement. The heated liquid is circulated through the system by means of a circulating pump 14, in a closed circuit constituted by the supply mains 15, the various branches 10, 11 and 12, the return main 16, and then back to the heat source 13.

Figure 1A:
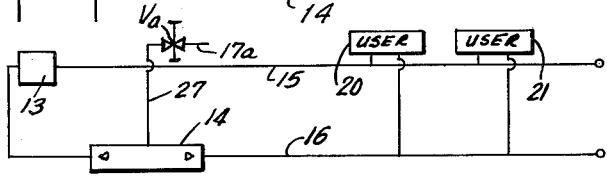
FIG. 1A is a similar flow diagram of a modified arrangement of the system embodying the invention.

An expansion tank 17 in which a liquid level 18 is maintained is arranged in the system as illustrated in FIGURE 1. This liquid level may be maintained from an appropriate source via pipe P in turn controlled by a valve $V_1$. The purpose for the presence of this liquid level 18 is to absorb the volume changes in the system due to thermal expansion and contraction of the liquid heat carrier. The expansion tank 17 is not filled completely with liquid but only to a level such that a vapor or gas pressure cushion 19 remains between the surface of the liquid 18 and the top of the expansion tank 17. The purpose of this pressure cushion 19 is to communicate a basic pressure to the entire system which must exceed the flash point pressure in the system and this basic pressure must be impressed upon the system at all times; i.e., during liquid circulation and during liquid repose in order to prevent flashing of the liquid. Maintenance of desired pressure of cushion 19 may be effected by any type of conventional pressure control system S. In the case of vapor pressurized systems, the vapor is often raised in the heat source 13 itself by heating the liquid. The point where the expansion tank 17 is joined to the system becomes the point of application of the basic static pressure to the system. The closed expansion tank 17 may be left open if desired, and head pressure of liquid in such open tank utilized to impose a pressure on the system only slightly above the flash point of the heat conveying liquid in the system. Tank 17 may also be replaced by mechanical pressurization such as, for instance, a supply of the same liquid at a higher or a lower pressure delivered by a line 17a (FIG. 1A) controlled by a valve $Va$ to similarly impose a corresponding pressure on the system. When valve $Va$ is opened for such purposes valve V is closed cutting the expansion tank out of the system.

The basic static pressure applied to the system by the expansion tank 17 or its substitute is a datum and when no pumps are in operation, the pressure at any point in the completely filled system equals the datum pressure plus or minus the head of the liquid column corresponding to the elevation of the point in reference above or below the point of pressure application.

The liquid heat carrier is maintained in circulation in the system by the pump 14, and the pump head equals the frictional resistance due to the flow of the liquid in the circuit. This resistance head is equal to the pump head at the pump outlet and zero at the pump suction inlet. At any point of the system, it equals the resistance of the remainder of the circuit from the reference point to the pump suction inlet.

When the pump is in operation, an additional pressure is, therefore, imposed on the datum pressure. The pressure at every point of the system must exceed the vapor pressure to prevent flashing of the liquid. The basic static pressure applied by the expansion tank 17 must be sufficiently high, and the liquid temperature at critical points in the system sufficiently low to achieve this requirement.

The heat supplied to the system is utilized in the heat using equipment 20, 21 and 22, situated in the branches 10, 11 and 12 connected between the supply main 15 and the return main 16. These branches may consist of one or more users in series or in parallel, so connected that the integral flow through them comes from the supply main 15, and leads to the return main 16, and/or the branches may be self-recirculating systems by means of a pump 23. A controlled quantity of hot liquid may be admitted to each branch system 10, 11 and 12 from supply main 15 through valve 24 and returned to main 16 through valve 25. These branch systems 10, 11 and 12 may be subdivided further into zones in which individual temperatures are maintained.

Figure 2:
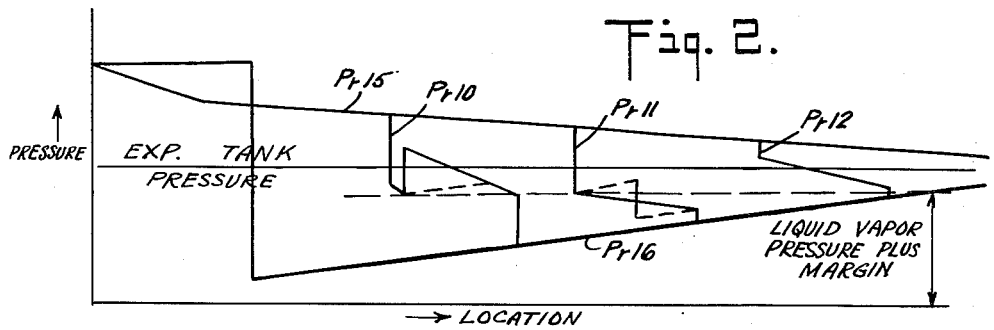
FIGURE 2 is a graphical presentation of the pressures existing at the various locations in the multiple branch heating system depicted in FIGURE 1.

The branches 10, 11 and 12 are connected in parallel between the supply main 15 and the return main 16 and the pressure distribution in them is governed by the pressure in the supply and return mains 15 and 16 in such a way that when the circulating pump 14 is running, the pressure in the supply main 15 is higher than that in the branch supply connections and the pressure in the return main 16 is lower than that in the return connections. This pressure relationship is illustrated graphically in FIGURE 2 wherein the line $Pr15$ depicts the pressure in the supply main 15, the line $Pr16$, the pressure in the return main 16 and the lines $Pr10$, $Pr11$ and $Pr12$ the respective pressures in the branch systems 10, 11 and 12 and their components.

In order to provide for circulation of the liquid heat carrier in the heating system, one or more circulating pumps must be inserted at some location in the system. In prior art multiple branch heating systems, one or more circulating pumps were placed in the system in such manner that the expansion tank was either on the suction side of the pump or on the discharge side of the pump. The disadvantage of these prior art systems was that a pressure considerably in excess of the liquid carrier vapor pressure had to be maintained in the components of both the primary and branch systems. This was true whether the expansion tank 17 was placed on the suction or discharge side of the circulating pump or pumps. In conventional multiple branch heating systems therefore the pressure in the system is always considerably higher than necessary.

Figure 3:
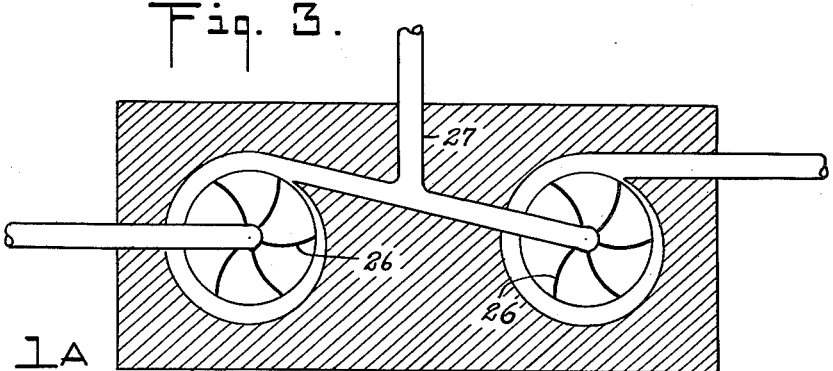
FIGURE 3 is a schematic front elevation of one form of multiple stage circulating pump which may be used in the present invention, portions of the view being in cross-section in order to illustrate structural details.

In accordance with the present invention as depicted in FIGURE 1, a multi-stage, for example, a two-stage pump 14 having stage impellers 26 is utilized as illustrated in FIGURE 3. As is seen clearly in FIGURE 3, this pump 14 is a centrifugal pump whose impellers are driven by a common shaft. The discharge of one stage of the multi-stage pump 14 is connected to the suction side of the next stage and an outlet connection 27 is provided between the stages. As illustrated in FIGURE 1, the expansion tank 17 is connected to the outlet 27 between two stages of the multi-stage centrifugal pump 14. In this manner, the expansion tank pressure being applied to the system by means of the expansion tank 17 is communicated to the junction between two stages of the multi-stage pump 14. It is to be pointed out that driving all the impellers from a common shaft aids in maintenance of pressure in the system near the vapor pressure of the heat conveying liquid during liquid circulation and during liquid repose and makes the system independent of unbalancing tendencies which might result if the impellers were separately driven. Thus, if drive motor failure occurs, both common shaft mounted impellers stop. This then becomes the situation of liquid repose. At this time, however, the pressure of the heat conveying liquid is maintained above the vapor pressure of the heat conveying liquid by reason of the pressure introduced via line 27 which is connected in advance of the junction between the two stages of the pump 14. On the other hand, while both impellers are driven by their common shaft maintenance of pressure in the system is also maintained near the vapor pressure of the heat conveying liquid by the pressure introduced into line 27 coming either from tank 17 or via lines 17$a$ and valve V$a$ thereto, which pressure is delivered at the junction between the stages of the multi-stage pump. There is no danger of any unbalance occurring as would be likely to occur if the impellers were separately driven and power failure to one of the drive shafts of one of the impellers were to occur. As pointed out above prior art systems are known in which the expansion tank is located either on the suction side or on the discharge side of the pump. A comparison of such systems with mine will aid greatly in understanding the utility of my system.

In these comparisons, water is regarded as the heat transfer liquid in a simple heating system. This is assumed to consist of a high temperature hot water heater, one or more users at the end of a long supply main with identical return main back to the heater, a circulating pump and an expansion tank which applies datum pressure to the system.

In the assumed systems pressure drop caused by resistance to flow in the supply line from the heater to user is 50 p.s.i. and in the return line from the user to the heater, also 50 p.s.i. Supply temperature to the user is 335° F. and return temperature from the user 235° F.

For simplicity it is assumed that no heat loss occurs in the supply and return lines, that there is no pressure drop in the flow through the heater and user, and that all elements including expansion tank if provided, of the compared systems are at the same elevations.

In consequence we have a heater entering temperature of 235° F., a heater leaving temperature of 335° F. and a circulation pump with 100 p.s.i. head to overcome the resistance to flow in the circuit.

The vapor pressure corresponding to 335° F. water in the heater, the supply line and the user is 97 p.s.i.g., and in the return line it is 8 p.s.i.g.. Allowing for a slight margin then the pressure in the heater, the supply line and the user must be maintained at not less than 100 p.s.i.g., and in the return line at a minimum of 10 p.s.i.g.

($a$) Assuming location of the expansion tank on the inlet side of the pump (one of the known systems above noted) and the other parameters mentioned above, then in order to maintain the required pressure to prevent flashing, the expansion tank pressure must be 100 p.s.i.g. This system ($a$) then has to be designed as follows:

|  | p.s.i.g. |
|---|---|
| Expansion tank | 100 |
| Heater | 100 |
| Supply line | 200 |
| User | 150 |
| Return line | 150 |

($b$) Assuming location of the expansion tank on the discharge side of the pump and the pump on the downstream side of the heater (another of the known systems above noted), then in order to prevent flashing the expansion tank must be maintained at 200 p.s.i.g. pressure. When the pump is operating, the pressure in the heater is 100 p.s.i.g., in the supply line 200 to 150 p.s.i.g., in the user 150 p.s.i.g. and in the return line 150 to 100 p.s.i.g. This system ($b$) therefore, has to be designed as follows:

|  | p.s.i.g. |
|---|---|
| Expansion tank | 200 |
| Heater | 200 |
| Supply line | 200 |
| User | 200 |
| Return line | 200 |

($c$) In a system according to my invention wherein the multistage centrifugal pump 14 is employed and the expansion tank is connected between the stages, with a two stage pump each stage has a 50 p.s.i. head. The heater is shown located on the discharge side of the pump. In order to prevent flashing, the expansion tank is maintained at 100 p.s.i.g. When the pump is at rest, the entire system is at 100 p.s.i.g. pressure. When the pump is operating, the pressure in the heater is 150 p.s.i.g., in the supply line 150 to 100 p.s.i.g., in the user 100 p.s.i.g.

and in the return line 100 to 50 p.s.i.g. My system, therefore, has to be designed as follows:

|  | p.s.i.g. |
|---|---|
| Expansion tank | 100 |
| Heater | 150 |
| Supply line | 150 |
| User | 100 |
| Return line | 100 |

Tabulating the required design pressures for the known systems (a) and (b) and my system (c) we have the following:

|  | Known (a) p.s.i.g. | Known (b) p.s.i.g. | Mine (c) p.s.i.g. |
|---|---|---|---|
| Expansion tank | 100 | 200 | 100 |
| Heater | 100 | 200 | 150 |
| Supply line | 200 | 200 | 150 |
| User | 150 | 200 | 100 |
| Return line | 150 | 200 | 100 |

This tabulation indicates clearly that in a system embodying my invention, overall pressures required in the equipment components are generally lower than in the conventional systems (a) and (b).

The expansion tank used generally is a cylindrical vessel and its wall thickness is governed by the pressure. A 100 p.s.i.g. tank is cheaper than one required for 150 or 200 p.s.i.g. Valves and pipe fittings are manufactured to certain definite pressure standards. Thus, for example, a lighter and cheaper valve may be used for pressures below 125 p.s.i.g. than above. User coils at 100 p.s.i.g., for instance, may be available as a standard item and made of cast iron and therefore, cheaper than those for 150 or 200 p.s.i.g. where they may have to be made of steel and manufactured to rigid specifications. In consequence, it can be seen readily that a system constructed embodying my invention is much more economical and adaptable than the compared prior art systems and thus possesses great utility.

What has been described is a multiple branch heating system in which it is not necessary to maintain a pressure in the system considerably in excess of the heating liquid vapor pressure. This is accomplished through the utilization of one or several multiple stage circulating pumps in parallel, with connection between the stages to the expansion tank rather than by a plurality of single pumps. It is to be understood that the invention is not to be limited to any particular heating liquid, or to the number of branch systems.

I claim:

1. In a closed multi-branch heating system wherein a heat generator supplies a heat-conveying liquid at approximately flash temperature through distributing means to a primary heating system and one or more secondary heating systems connected therewith; apparatus for maintaining a pressure in the system near the vapor pressure of the heat-conveying liquid during liquid circulation and during liquid repose comprising a multi-stage centrifugal circulating pump assembly, said assembly including a plurality of stages whose impellers are driven by a common shaft and junction means coupling the outlet of one of the stages to the inlet of another of the stages, an outlet duct coupled to said junction means, an expansion tank coupled to said outlet duct in advance of said junction means and provided with a vapor space above the liquid level in the tank whereby the pressure head of liquid in advance of the junction means added to the pressure of a medium in said vapor space is imposed on said system, and means for maintaining the pressure in said vapor space constant and at a value above the flash point pressure of the heat-conveying liquid at any point of the system.

2. In a closed multi-branch heating system wherein a heat generator supplies a heat-conveying liquid at approximately flash temperature through distributing means to a primary heating system and one or more secondary heating systems connected therewith; apparatus for maintaining a pressure in the system near the vapor pressure of the heat-conveying liquid during liquid circulation and during liquid repose comprising a multi-stage centrifugal circulating pump assembly, said assembly including a plurality of stages whose impellers are driven by a common shaft and junction means coupling the outlet of one of the stages to the inlet of another of the stages, an outlet duct coupled to said junction means, an expansion tank coupled to said outlet duct in advance of said junction means and provided with a vapor space above the liquid level in the tank whereby the pressure head of liquid in advance of the junction means added to the pressure of a medium in said vapor space is imposed on said system, and external loading means for maintaining the pressure in said vapor space constant and at a value above the flash point pressure of the heat conveying liquid at any point of the system.

3. A system in accordance with claim 1 wherein said heat-conveying liquid is water.

4. In a closed multi-branch system wherein a heat generator supplies a heat-conveying liquid at approximately flash temperature through distributing means to a primary heating system and one or more secondary heating systems connected therewith; apparatus for maintaining a pressure in the system slightly above the vapor pressure of the heat-conveying liquid during liquid circulation and during liquid repose comprising a multi-stage centrifugal circulating pump assembly, said assembly including a plurality of stages whose impellers are driven by a common shaft and junction means coupling the outlet of one stage to the inlet of another stage, an outlet duct coupled to said junction means, an expansion tank coupled to said outlet duct in advance of said junction means and provided with a vapor space above the liquid level in the tank whereby a basic static pressure comprising the pressure head of liquid in advance of the junction means added to the pressure of a medium in said vapor space is imposed on said system, and means for maintaining the pressure imposed on said system constant and at a value whereby the basic static pressure imposed on said system is higher than the vapor pressure.

5. A method of operating a closed multi-branch heating system wherein a heat conveying liquid from a heat generator is conveyed at approximately flash temperatures through distributing means to a primary heating system and secondary heating systems by a multi-stage centrifugal circulating pump whose impellers are driven by a common shaft and wherein the junction means coupling the outlet of one stage to the inlet of another stage has a duct coupled thereto and to an expansion tank located in advance of said junction means and having a vapor space therein above the liquid level in the tank comprising the steps of maintaining the pressure in the vapor space constant and at a value above the flash point pressure of the heat conveying liquid at any point of the system and imposing the pressure of liquid from the tank in advance of the junction means added to the pressure of a medium in said vapor space on said system via said duct and junction means between the said stages of said pump at all times during liquid circulation and during liquid repose.

6. A method of operating a closed multi-branch heating system wherein a heat conveying liquid from a heat generator is conveyed at approximately flash temperatures through distributing means to a primary heating system and secondary heating systems by a multi-stage centrifugal circulating pump whose impellers are driven by a common shaft and wherein the junction means coupling the outlet of one stage to the inlet of another stage has a duct coupled thereto and to an additive pressure source located in advance of the junction means comprising the steps of maintaining pressure from the additive source constant and at a value above the flash point pressure of the heat conveying liquid at any point of the system and imposing the pressure head of liquid in the duct in advance of the junction means added to the pressure of the additive source on said system via said duct and junction means between the stages at all times during liquid circulation and during liquid repose.

7. A method of operating a closed multi-branch heating system wherein a heat conveying liquid from a heat generator is conveyed at approximately flash temperatures through distributing means to a primary heating system and secondary heating systems by a multi-stage centrifugal circulating pump whose impellers are driven by a common shaft and wherein the junction means coupling the outlet of one stage to the inlet of another stage has a duct coupled thereto and to an expansion tank located in advance of said junction means and having a closed vapor space therein above the liquid level in the tank to provide a vapor cushion in said space above said liquid level comprising the steps of maintaining the pressure of the cushion in the vapor space constant and at a value above the flash point pressure of the heat conveying liquid at any point of the system and imposing the pressure head of liquid in said tank in advance of said junction means added to the pressure of a medium in said vapor space on said system via said duct and junction means between said stages of said pump at all times during liquid circulation and during liquid repose.

References Cited in the file of this patent
UNITED STATES PATENTS

| | | |
|---|---|---|
| 1,472,931 | Morison | Nov. 6, 1923 |
| 2,650,031 | Hitch et al. | Aug. 25, 1953 |
| 2,698,576 | Strub | Jan. 4, 1955 |
| 2,790,606 | Morgan et al. | Apr. 30, 1957 |